United States Patent
Solms et al.

(10) Patent No.: US 6,545,065 B2
(45) Date of Patent: *Apr. 8, 2003

(54) LASER-MARKABLE PLASTICS

(75) Inventors: Hans-Jürgen Solms, Pfungstadt (DE); Manfred Kieser, Darmstadt (DE)

(73) Assignee: Merck Patent Gesellschaft mit beschränkter Haftung, Darmstadt (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/214,303

(22) PCT Filed: Jul. 16, 1997

(86) PCT No.: PCT/EP97/03812

§ 371 (c)(1), (2), (4) Date: Jan. 4, 1999

(87) PCT Pub. No.: WO98/03583

PCT Pub. Date: Jan. 29, 1998

(65) Prior Publication Data

US 2002/0068773 A1 Jun. 6, 2002

(30) Foreign Application Priority Data

Jul. 23, 1996 (DE) .......................... 196 29 675

(51) Int. Cl.[7] .................................. C09D 5/29
(52) U.S. Cl. ................ 523/171; 524/449; 524/430
(58) Field of Search ................ 428/363, 403; 523/171, 202, 212; 524/497, 449, 584, 586; 106/417

(56) References Cited

U.S. PATENT DOCUMENTS

| | | | | | |
|---|---|---|---|---|---|
| 4,861,620 | A | * | 8/1989 | Azuma et al. | 427/53.1 |
| 5,667,580 | A | * | 9/1997 | Babler | 106/499 |
| 5,916,943 | A | * | 6/1999 | Heller et al. | 524/360 |
| 5,928,780 | A | * | 7/1999 | Schmidt et al. | 428/331 |
| 5,976,411 | A | * | 11/1999 | Feng et al. | 252/301.5 |
| 5,977,514 | A | * | 11/1999 | Feng et al. | 219/121.69 |
| 6,017,972 | A | * | 1/2000 | Harris et al. | 522/2 |
| 6,019,831 | A | * | 2/2000 | Schmidt et al. | 106/417 |
| 6,022,905 | A | * | 2/2000 | Harris et al. | 522/2 |
| 6,238,471 | B1 | * | 5/2001 | Vogt et al. | 106/417 |
| 6,280,520 | B1 | * | 8/2001 | Andes et al. | 106/415 |

FOREIGN PATENT DOCUMENTS

| | | |
|---|---|---|
| EP | 0607597 | 7/1994 |
| WO | 9530546 | 11/1995 |

* cited by examiner

Primary Examiner—Edward J. Cain
Assistant Examiner—Katarzyna Wyrozebski
(74) Attorney, Agent, or Firm—Millen, White, Zelano & Branigan, P.C.

(57) ABSTRACT

The present invention relates to laser-markable plastics of which a feature is that they include, as absorber material, a mixture of pearl luster pigments and/or non-lustrous metal oxide-coated mica pigments and inorganic platelet-form substrates.

17 Claims, No Drawings

LASER-MARKABLE PLASTICS

The present invention relates to laser-markable plastics of which a feature is that they include, as absorber material, a mixture of pearl lustre pigments and/or non-lustrous metal oxide-coated mica pigments and inorganic platelet-form substrates.

The labelling of production goods is becoming increasingly important in almost all sectors of industry. For example, it is frequently necessary to apply production dates, expiry dates, barcodes, company logos, serial numbers, etc. At present, these marks are predominantly made using conventional techniques such as printing, embossing, stamping and labelling. However, the importance of non-contact, high-speed and flexible marking using lasers is increasing, especially in the case of plastics. This technique makes it possible to apply graphic inscriptions, for example barcodes, at high speed even on a non-planar surface. Since the inscription is within the plastics article itself, it is durable and abrasion-resistant.

Many plastics, for example polyolefins, have hitherto proved to be very difficult or even impossible to mark by means of lasers. A $CO_2$ laser which emits light in the infrared region at 10.6 µm produces only a faint, barely legible mark in the case of polyolefins, even at very high output levels, since the absorption coefficient of the plastics to be processed is not high enough at these wavelengths to induce a colour change in the polymeric material. The plastic must not completely reflect or transmit the laser light, since if it did there would be no interaction. However, it must also not be too high a level of absorption, since in this case the plastic evaporates to leave only an engraving. The absorption of the laser beams and thus the interaction with the material depends on the chemical structure of the plastic and on the laser wavelength used. In many cases it is necessary to add appropriate additives, for example absorbers, in order to render plastics laser-inscribable.

The article "Pearl Lustre Pigments—Characteristics and Functional Effects" in Speciality Chemicals, May 1982, Vol. 2, No. 2 discloses the use of pearl lustre pigments for laser marking. Pearl lustre pigments, however, have the disadvantage that they alter very severely the colour properties of the plastic, an effect which is often unwanted.

In DE-C-29 36 926, plastics are marked with the aid of fillers whose colour can be altered.

DE-A 29 36 926 discloses that the inscription of a polymeric material by means of laser light can be achieved by adding to the plastic a filler, such as carbon black or graphite, which discolours on exposure to energetic radiation.

The fillers known for laser marking, however, have the disadvantage either that they durably colour the plastic to be inscribed, as a result of which the laser inscription, which is usually a dark script on a paler background, is then no longer sufficiently high in contrast—i.e. legible—or that, as for example with kaolin, the marking is very faint and only becomes readily visible when high quantities of the additive are employed.

In the laser marking of polyethylene, for example, the contrast of a marking is found to depend on the energy density of the laser, in the sense that a higher energy density produces darker markings. In polypropylene, which generally gives light markings at low energy densities, somewhat darker markings can only be obtained with extremely high energy densities.

Using the absorbers known from the prior art, and especially at average colouring lightnesses (L values of between 10 and 80), it is possible only to obtain markings which are difficult to read, and it is impossible to obtain, at the same time, two-colour (light and dark) markings.

The object of the present invention, therefore, was to find laser-markable plastics which enable a two-coloured high-contrast laser marking to be obtained on exposure to laser light and which make it possible, given appropriate choice of the laser energy densities, to obtain light and dark markings in one colouring operation. In this context, the filler or successful absorber should have a very pale, neutral inherent colour and should possess the properties of the precoloured plastic to be marked, or should need to be employed only in small amounts.

It has surprisingly been found that a mixture of pearl lustre pigments and/or non-lustrous metal oxide-coated mica pigments and inorganic platelet-form substrates make it possible in medium colourations to obtain high-contrast, high-definition and two-coloured markings.

The invention therefore provides laser-markable plastics, characterized in that they comprise a mixture of pearl lustre pigments and/or non-lustrous metal oxide-coated mica pigments and inorganic platelet-form substrates in medium colourations.

Through the addition of this pigment mixture in concentrations of from 0.5 to 10% by weight, based on the plastics system, preferably from 1 to 5% by weight and, in particular, from 1.5 to 3% by weight, a high contrast is achieved in laser marking. The concentration of the pigments in the plastic, however, is dependent on the plastics system employed and on the energy density of the $CO_2$ laser. The relatively low proportion of pigment does not substantially alter the plastics system and does not affect its ability to be processed. The mixture of pearl lustre pigment and/or non-lustrous metal oxide-coated mica pigments and inorganic platelet-form substrates can be employed in virtually all conceivable proportions. Mixtures of one part of pearl lustre pigment and 1–10 parts of inorganic platelet-form substrates, preferably 2–8 parts, in particular 3–5 parts, of the inorganic platelet-form substrates, have proven to be particularly suitable.

Transparent plastics doped with such pigments in pure colouration mostly show a slightly metallic gleam but retain their transparency. Through the addition of from 0.2 to 10% by weight, preferably from 0.5 to 3% by weight, of opaque pigments, for example titanium dioxide, this metallic lustre can, if required, be masked completely. Moreover, it is possible to add colour pigments to the plastics that permit colour variations of any kind and at the same time ensure that the laser marking is retained.

The inorganic platelet-form substrates suitable for the marking are $SiO_2$ flakes, phyllosilicates, such as calcine and non-calcine mica, glass, talc, kaolin or sericite, while particularly preferred micas employed are muscovite, biotite, phlogopite, vermiculite and also synthetic micas. As phyllosilicate it is preferred to employ mica. The phyllosilicates have particle sizes of 1–150 µm, preferably 5–60 µm.

All known pearl lustre pigments can be used as absorber material, as are described, for example, in the German Patents and Patent Applications 14 67 468, 19 59 998, 20 09 566, 22 14 545, 22 15 191, 22 44 298, 23 12 331, 25 22 572, 31 37 808, 31 37 809, 31 51 343, 31 51 354, 31 51 355, 32 11 602, 32 35 017 and 38 42 330. Particular preference, however, is given for the use of pearl lustre pigments based on mica flakes coated with metal oxides, especially titanium dioxide and/or iron oxide. Non-lustrous, metal oxide-coated mica pigments are known from DE 43 40 146 and DE 19 546 058.

As absorber material it is also possible to employ a combination of a mixture of different phyllosilicates and/or one or more pearl lustre pigments.

For the laser marking it is possible to employ all known plastics, as described, for example, in Ullmann, Vol. 15, p. 457 et seq., Verlag VCH. Examples of suitable plastics are polyethylene (PE), polypropylene (PP), polyesters, polyphenylene oxide, polyacetal, polybutylene terephthalate, polymethyl methacrylate, polyvinyl acetal, acrylonitrile-butadiene-styrene (ABS), acrylonitrile-styrene-acrylate (ASA), polycarbonate, polyether sulfone, polyether ketones and their copolymers and/or mixtures thereof. Polyolefins are particularly suitable owing to their mechanical properties and the inexpensive processing techniques.

Preference is given to the use of PE-HD, PE-LD, PE-LLD and PP and also copolymers of PE and of PP.

The pigment mixture is incorporated into the plastic by mixing the plastics granules with the phyllosilicate and pearl lustre pigment. The two pigments can be added individually, simultaneously or in succession, or else as a mixture. The pigmented plastic is then shaped under the action of heat. If desired, adhesives, organic polymer-compatible solvents, stabilizers and/or surfactants which are temperature-stable under the operating conditions can be added to the plastics granules during incorporation of the pigments. The plastics granules/pigment mixture is generally prepared by introducing the plastics granules into an appropriate mixer, wetting them with any additives used, and then adding and mixing in the pigments or the pigment mixture. The resulting mixture can be processed directly in an extruder or injection-moulding machine. The mouldings produced on processing usually exhibit very homogeneous distribution of the pigments. The pigment can also be employed in the form of masterbatches for colouring thermoplastics. In this way, it is possible to meet even the most stringent requirements in respect of pigment dispersion. Finally, laser marking takes place, preferably with a $CO_2$ laser.

Inscription with the laser is carried out by introducing the sample into the beam path of a pulsed laser, preferably a $CO_2$ laser. Inscription with an Nd-YAG laser or with an excimer laser is also possible. However, the desired results can also be achieved with other, conventional types of laser which have a wavelength in a range of high absorption by the pigment used. The shade and depth of colour obtained are determined by the laser parameters, such as the irradiation time and irradiation output. Low energy densities lead to light markings in the pigmented plastics system, while high energy densities lead to dark markings. The output of the lasers used depends on the particular application and can readily be determined by the skilled worker in each individual case.

The novel pigmented plastic can be used in all sectors where customary printing processes have hitherto been employed for the inscription of plastics. For example, mouldings of the novel plastic can be used in the electrical, electronics and motor vehicle industries. The labelling and inscription of, for example, cables, wires, trim strips or functional parts in the heating, ventilation and cooling sectors, or switches, plugs, levers and handles which consist of the novel plastic, is possible even at difficult-to-reach points with the aid of laser light. Owing to its low heavy-metal content, the novel plastics system can also be employed in packaging in the foodstuffs sector or in the toy sector. The markings on packaging are notable for their resistance to wiping and scratching, are stable during subsequent sterilization processes, and can be applied in a hygienically pure manner in the marking process. Complete label motifs can be applied durably to the packaging for a reusable system. Another important area of application for laser inscription is that of plastic tags for the individual identification of animals; so-called cattle tags or earmarks. The laser marking of plastics articles or mouldings which consist of the novel plastic is therefore possible.

The examples which follow are intended to illustrate the invention without, however, limiting it. The formulation data are given in per cent by weight and relate to the already coloured material (plastic+pigment).

EXAMPLES

Example 1

Blue-green PE-HD granules are pigmented with 0.3% Iriodin 120 ($TiO_2$-coated mica pigment with a particle size of 5–20 μm from E. Merck, Darmstadt) and 1.5% Iriodin LS 800 (mica powder with particles <15 μm) and are processed on an injection-moulding machine. The resulting moulding (a small plate) is subsequently inscribed using a $CO_2$ laser. At a geometry of 45°/0°, the plate shows the following Lab values: L=55.3; a=−46.5; b=−12.7.

The marking with the $CO_2$ laser shows a distinctly pale marking at low energy density (~2 $J/cm^2$) and a dark marking at an energy density of 14 $J/cm^2$.

Example 2

Blue PE-HD granules which have been given a pearlescent colouration with 0.5% Iriodin 100 Silberperl ($TiO_2$-coated mica pigment with a particle size of 10–60 μm from E. Merck, Darmstadt) are injection moulded with the addition of 2.5% of Iriodin LS 800. The finished moulding can be given, depending on the energy density of the laser beam, either a light (energy density ~3 $J/cm^2$) or a grey (energy density ~12 $J/cm^2$) marking. The colour of the mouldings can be measured, at a geometry of 45°/0°, at L=40.6; a=−17.5; b=−32.6.

Comparative Example 1

Blue-green PE granules are coloured with 0.3% Iriodin 120 and then processed on an injection-moulding machine. The resulting moulding (small plate) is subsequently inscribed with a $CO_2$ laser. As the energy density (~14 $J/cm^2$) of the laser increases, the inscription gets darker and darker.

Comparative Example 2

Blue-green PE granules are pigmented with 2% Iriodin LS 800 (mica powder with particles <15 μm, calcine) and are processed on an injection-moulding machine. The marking shows a pale inscription with little dependency on the energy density (2–14 $J/cm^2$).

Example 3

PP granules (PP-HD, Stamylen PPH 10 from DSM) are pigmented with 0.5% Iriodin® 123, 1.5% Iriodin LS 800 and 0.1% PV Echtblau (Hoechst AG) and are processed on an injection-moulding machine.

Example 4

As Example 3, but with
0.5% Iriodin® 123
0.5% Iriodin LS 800 and
0.1% PV Echtblau

Example 5

As Example 3, but with
0.5% Iriodin® LS 810 ($TiO_2$ of mica)

0.3% Iriodin® LS 800
0.1% PV Echtblau

Example 6

PE granules (PE-HD, Hostalen GA 7260, Hoechst AG) are pigmented with 0.5% Iriodon® 502, and 0.5% Iriodin® LS 800 and are processed on an injection-moulding machine.

Example 7

As Example 6, but with
0.5% Iriodin 502 ($Fe_2O_3$-coated mica pigment)
1.0% Iriodin LS 800

Example 8

As Example 7, but with
0.5% Iriodin® 502
1.5% Iriodin® LS 800

The samples from Examples 3–8 were each inscribed with 4 energy densities for each formulation. Light markings were obtained at energy densities of 2.5 $J/cm^2$, 3.2 $J/cm^2$ and 7.2 $J/cm^2$ and dark markings at 9.3 $J/cm^2$ and 30.8 $J/cm^2$.

The high-definition markings were distinguished by their high contrast and were readily legible. No foaming-up of the plastics system was observed.

What is claimed is:

1. A laser-markable plastic which comprises, as an absorber material in the plastic, a pigment mixture consisting of:
    at least one pearl luster pigment and/or at least one non-lustrous metal oxide-coated mica pigment, and
    at least one inorganic platelet-form substrate, the pigment mixture being provided in amounts effective to enable the plastic to be marked with a pale marking by a laser at low energy density and marked with a dark marking by a laser at high energy density.

2. The laser-markable plastic according to claim 1, wherein the ratio of pearl luster pigment and/or non-lustrous metal oxide-coated mica pigment to inorganic platelet-form substrate in the pigment mixture is from 1:1 to 1:10.

3. The laser-markable plastic according to claim 1, wherein the inorganic platelet-form substrate is mica.

4. The laser-markable plastic according to claim 1, wherein the pearl luster pigment and/or the non-lustrous metal oxide-coated mica pigment is a mica substrate coated with $TiO_2$ and/or $Fe_2O_3$.

5. The laser-markable plastic according to claim 1, wherein the proportion of the pigment mixture in the plastic is from 0.5 to 10% by weight based on the total weight of the plastic.

6. The laser-markable plastic according to claim 1, wherein the plastic is polyethylene or polypropylene.

7. The laser-markable plastic of claim 1, wherein the proportion of the pigment mixture in the plastic is from 1 to 5% by weight based on the total weight of the plastic.

8. The laser-markable plastic of claim 1, wherein the laser-markable plastic containing the pigment mixture is transparent.

9. The laser-markable plastic of claim 1, wherein the at least one inorganic platelet-form substrate is $SiO_2$ flakes, a phyllosilicate, glass, talc, kaolin or sericite.

10. The laser-markable plastic of claim 1, wherein the pigment mixture comprises a pearl luster pigment.

11. The laser-markable plastic of claim 1, wherein the pigment mixture comprises a pearl luster pigment and a platelet-form phyllosilicate substrate.

12. A laser-markable shaped plastic article of the laser-markable plastic of claim 1.

13. A method for laser-marking a plastic which comprises subjecting a laser-markable plastic according to claim 1 to a laser at low energy density and a laser at high energy density to provide distinct pale markings and dark markings.

14. The method of claim 13, wherein the marking is conducted with a $CO_2$ laser.

15. The method of claim 14, wherein the pale markings are obtained by marking with the laser at a low energy density of from about 2 to about 7 $J/cm^2$ and the dark markings are obtained with the laser at a high energy density of from about 9 to 30 $J/cm^2$.

16. A method for laser-marking a plastic which comprises applying a laser to the laser-markable plastic according to claim 1.

17. The method of claim 16, wherein the marking is conducted with a $CO_2$ laser.

* * * * *